INVENTORS.
Elsner C. Lundholm
Harry L. Lundholm
BY Parker & Carter
Attorneys.

United States Patent Office 3,328,975
Patented July 4, 1967

3,328,975
DROP-IN CHILLER-FILTER WITH BAFFLE SCREENS
Elsner C. Lundholm and Harry L. Lundholm, Rockford, Ill., assignors to Lundholm Manufacturing Company, Rockford, Ill., a corporation of Illinois
Filed Nov. 12, 1965, Ser. No. 507,306
5 Claims. (Cl. 62—317)

This invention relates to a combination filter and chiller and particularly to such a unit which may both filter and cool coolant of the type normally utilized in machine tool operations.

One purpose of the invention is a combination unit of the type described in which the cooling operation is performed after filtering.

Another purpose is a combination unit of the type described in which the filtering is accomplished by removable screens.

Another purpose is a combination filter and chiller in which both the screens for filtering and the cooling means are removable.

Another purpose is a compact, reliably operable combination filter and chiller.

Another purpose is a filter of the type described in which the screens positioned in the filter flow path are arranged for coolant overflow, about the screens, in the event the screens become clogged.

Other purposes will appear in the ensuing specification, drawings and claims.

Figure 1:
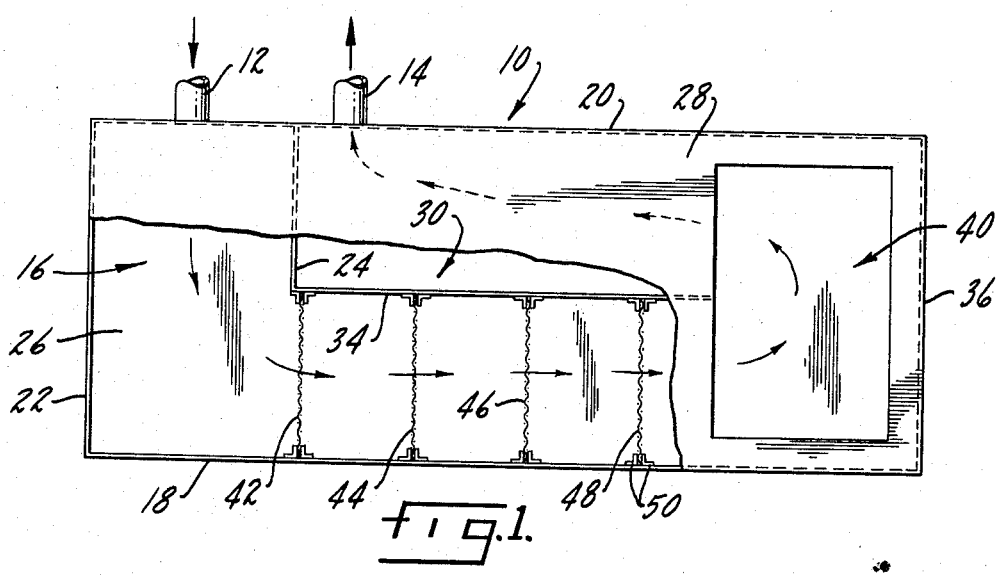
Figure 2:
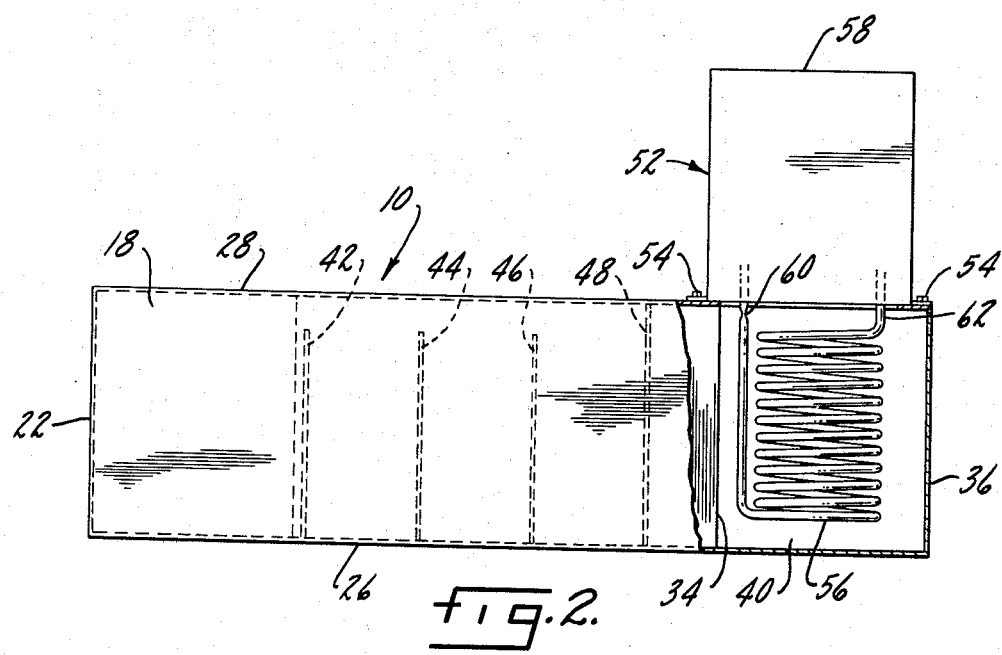

The invention is illustrated diagrammatically in the following drawings wherein:

FIGURE 1 is a top plan view, with portions cut away, of a unit of the type described, with the cooling means removed, and FIGURE 2 is a side elevation of the device illustrated in FIGURE 1, with portions cut away, and with the cooling means added.

The filter of this invention may include an outer housing indicated generally at 10, which may be formed of sheet metal or the like, and which has an inlet conduit 12 and an outlet conduit 14. As is conventional in filters of this type, the coolant will be taken from a machine tool operation to the inlet conduit 12, and after the filtering and cooling operations, the coolant will pass from the conduit 14 and be directed to the place of use. Although we have not shown it herein, a pump may be added so that the coolant is supplied under pressure and is continuously moved through the filter unit. Such a pump may be placed within the housing or it may be outside of the housing.

Within the housing 10 is a coolant inlet zone 16 which is in communication with the coolant inlet 12 and is defined by side walls 18 and 20, and end wall 22, which are a part of the outside housing 10, and an inner wall 24. As illustrated in FIGURE 2 there may be a bottom 26, which extends completely throughout the filter unit, and a top 28, which extends generally throughout most of the filter unit, as will be described in detail hereinafter.

A coolant outlet zone 30 is defined by outer wall 20, by wall 24 which separates the inlet zone from the outlet zone, and by a longitudinally extending interior wall 34. The coolant outlet zone is enclosed by top 28 and bottom 26.

A flow path connects the inlet zone 16 and the outlet zone 30 and the first part of the flow path is defined by side wall 34, outer side wall 18, bottom 26, and top 28. What may be termed the secondary part of the flow path includes a large space 40, illustrated particularly in FIGURE 1, which is arranged to receive the refrigeration unit. The cooling or refrigeration zone 40 is defined by walls 18, 20 and side wall 36. The space 40 is in communication with the flow path defined between walls 34 and 18 and is also in communication with the coolant outlet zone 30. Note that the space 40 is substantially open at the top so that the refrigeration unit may be removed, as desired. In effect, the inlet zone 16, outlet zone 30, the flow path and the refrigeration zone 40, form a reservoir through which the coolant passes as it is filtered and cooled.

Positioned within the flow path defined between walls 34 and 18 are a plurality of screens indicated at 42, 44, 46 and 48. On opposite sides of walls 34 and 18 are guides or tracks 50, which are arranged to hold screens 42–48 in position so that the coolant flowing through the filter will pass successively through each of the screens. The spacing of the screens may vary, as may the number of screens, as what is important is to provide adequate screening for properly filtering the coolant. It is advantageous to have the screens removable so that the fineness of filtering may be controlled or regulated, simply by changing the filter screen.

As illustrated in FIGURE 2, the tops of screens 42–46 are spaced from upper wall or top 28. However, screen 48, or the end screen runs completely up to the top of wall 28. In this way, if one of the initial filtering screens becomes clogged, by the material being filtered, the coolant will simply flow over that particular screen and there will not be a complete obstruction in the unit. Normally the coolant will be run through the device at such a pressure and in such a volume that it will not overflow the tops of the screens. Only when one of the screens becomes clogged will the coolant overflow that particular screen. The last screen in the line, or screen 48, runs clear to the top, as it is desired that the coolant must be filtered to some degree before it goes back to the work. In normal operation, the filtering accomplished by screen 48 should be minimum, as the initial screens should have removed most of the material. In this connection, the screens may vary in size of their openings. It is not necessary that all screens provide equal filtering.

A refrigeration unit indicated generally at 52 may seat upon the top of the housing and may be mounted by means of bolts or the like 54. The refrigeration unit 52 may be formed of two parts, an evaporator unit at the bottom, indicated at 56, and a condenser and compressor unit at the top, indicated generally at 58. The condenser and compressor have not been shown in detail as they may be conventional.

The evaporator 56 hangs down from the top unit 58 and extends into the zone 40 through which the coolant must pass before it reaches the outlet zone 30. As shown herein, the evaporator 56 is formed of steel or copper coils, connected together in a conventional manner. Obviously the invention should not be limited to such a configuration as finned tubes, plates, or any type of satisfactory evaporator structure may be practical. The inlet to the evaporator 56 may be controlled by an expansion valve or capillary valve 60, whichever is satisfactory. The outlet for the evaporator is indicated at 62.

The use, operation and function of the invention are as follows:

Shown and described herein is a combination filter and cooling unit which is utilized in the filtering of coolant, normally used with machine tools. The invention should not be limited to this particular application and it has application in any situation in which it is desirable to both filter and cool a particular fluid. The coolant will initially be supplied to the inlet zone 16 through an inlet tube 12. The coolant may be under pressure, from a pump attached to the filter itself, or there may be an external pump. In any event, the coolant from the inlet zone will pass through a succession of spaced screens which may vary in their filtering abilities. After the coolant has passed through the complete line of screens it will flow into a refrigeration zone in which it will be reduced down to an appropriate temperature. From the refrigeration zone the coolant will flow to an outlet zone and from there back to the work zone.

Of importance is the fact that the screens are removable, both for cleaning and for ease in changing the size of the particular screen. It is also important to note that all screens but the last in line do not extend clear up to the top of the flow path, but are spaced from the top of the flow path to permit coolant to flow over the top of the screen in the event a particular screen becomes clogged with material.

It is also important to note that the refrigeration unit is removable and can be simply placed in the refrigeration zone. This is desirable for maintenance purposes as well as for changing refrigeration units. The amount of refrigeration supplied can be easily controlled by external valving and what is important is to provide means for refrigerating the coolant prior to the time it is returned to the work zone.

The entire unit may be made of a suitable gauge sheet metal and is sufficiently compact that it may be placed closely adjacent any machine tool operation. The top may be readily removed for changing.

Whereas the preferred form of the invention has been shown and described herein, it should be realized that there are many modifications, substitutions and alterations thereto, within the scope of the following claims.

We claim:
1. In a fluid filter, a housing having side walls, end walls, a bottom and a top, an interior wall within said housing cooperating with at least one of said housing walls to define an inlet zone, an inlet port in said housing opening into said inlet zone, a second interior wall in said housing cooperating with said first-named interior wall and at least one of said housing walls to define an outlet zone, an outlet port in said housing in communication with said outlet zone, said second-named interior wall cooperating with at least one of said housing walls and the housing top to define a flow path between said inlet zone and said outlet zone, a plurality of spaced-apart filter screens in said flow path and generally perpendicular to the direction of fluid flow, at least one of said screens being spaced from the top to permit the fluid being filtered to flow over the top of said screen in the event it becomes clogged, with the screen closest to said outlet zone extending completely over the area of said flow path, and fluid cooling means in said flow path between the last of said screens and said outlet zone.

2. The structure of claim 1 further characterized by and including an opening in said top between the last of said screens and said outlet zone, with said cooling means being mounted on said top and extending downwardly through said opening into said flow path.

3. The structure of claim 1 further characterized in that said screens are removable.

4. The structure of claim 1 further characterized in that said cooling means includes an evaporator, positioned within said flow path, and means for providing coolant to the evaporator positioned above said flow path and extending generally outside of said housing.

5. The structure of claim 4 further characterized in that said evaporator is removable.

References Cited
UNITED STATES PATENTS

| | | | |
|---|---|---|---|
| 1,908,329 | 5/1933 | Dunham | 210—335 |
| 2,495,031 | 1/1950 | Stovall | 210—339 |
| 2,508,289 | 5/1950 | Peck | 62—448 |
| 2,671,603 | 3/1954 | Bauer | 62—449 |

WILLIAM J. WYE, *Primary Examiner.*